United States Patent Office 2,890,954
Patented June 16, 1959

2,890,954

PLUTONIUM ALLOYS

William Chynoweth, White Plains, N.Y., assignor to the United States of America as represented by the United States Atomic Energy Commission No Drawing. Application July 19, 1955
Serial No. 523,138

8 Claims. (Cl. 75—122.7)

The present invention is related to alloys of plutonium and more particularly to low melting point plutonium alloys.

Low melting point alloys of plutonium have the advantages of easier casting and fabricating, as well as fluidity at lower temperatures. In the field of liquid metal fuel neutronic reactors there is a definite need for an alloy of plutonium with a melting point low enough to be a practical liquid fuel, i.e., an alloy having a melting point about two hundred degrees centigrade lower than pure plutonium. However the neutronic characteristics of such an alloy should remain compatible with the use. Because of this limitation, the alloying metal must be selected so that its neutronic characteristics, such as neutron capture cross section, do not defeat the purpose for which the alloy is intended. Also, the container in which the plutonium alloy is to be kept within the reactor, should have suitable nuclear properties, such as a relatively low neutron capture cross section. Furthermore, there must be an inert relationship between the alloy and the container.

In a neutronic reactor, the flexibility of the reactor system is a function of the flexibility of the fuel and cooling systems. If the fuel is a liquid, then its ease of handling adds to the ease of operation and control of the reactor, including reactivity, heat removal, and reworking of the fuel. In such a reactor, a liquid fuel has the advantage that any portion of the fuel may be removed for chemical processing, such as a removal of fission products, and be replaced by an equivalent amount of new fuel so that the reactor can be operated continuously. Another advantage is that the fuel can be rapidly changed from a critical shape to a noncritical shape so that the reactor can be shut down or "safed" in a very short time. This may be accomplished, for example, by flowing the liquid fuel into a sufficiently long thin tube or a sufficiently large flat pan, so that a noncritical geometry is attained. Liquid fuel reactors also overcome problems of the fuel element dimensional instability which may be encountered with solid fuels.

Homogeneous neutronic reactors of the prior art using a liquid fuel composition in which the fissile material is compounded with ordinary or heavy water have special problems such as the disassociation of the water, special corrosion problems, the introduction of extraneous matter to form the necessary compounds, and decomposition of the fuel compounds. Liquid metal fuels have been desired to obviate such difficulties while maintaining most of the above mentioned advantages, and to provide, in general, better heat transfer characteristics.

An object of the present invention is to provide a low melting point alloy of plutonium.

Another object of the present invention is to provide a low melting point metal fuel system for a neutronic reactor.

Another object of the present invention is to provide a low melting point metal fuel system for a neutronic reactor in which the fuel container is a metal not affected by the constituents of the fuel.

Further objects of the present invention will be apparent from the following specifications and claims.

The principal objects of the present invention are accomplished by preparing a low melting point alloy of plutonium and at least one element of the group consisting of iron, cobalt and nickel in which the nonfissionable element is in the proportion of from about 8 to about 15 atomic percent. Plutonium melts at 640° C. which is high for a liquid fuel neutronic reactor, especially when water vapor (steam) is the heat exchange medium. The present invention shows that eutectic alloys of plutonium-iron, plutonium-cobalt or plutonium-nickel can be produced with melting temperatures appreciably lower than pure plutonium even though the melting point of the alloying metals is considerably higher than pure plutonium. The mixture percentages and melting temperatures of the eutectic alloys are as follows:

| Atomic percent alloy metal | Percent Pu | Melt. temp., ° C. |
|---|---|---|
| 14.0 Nickel | 86.0 | 465 |
| 9.5 Iron | 90.5 | 410 |
| 12.0 Cobalt | 88.0 | 405 |

In addition to the above specific examples of eutectic compositions, alloys using plutonium and more than one of the named iron group elements may be utilized for producing low melting point alloys.

The plutonium used in these alloys is at least 98–99% pure and does not contain significant amounts of neutron-absorbing elements. Although a lesser purity plutonium could be used if the impurities were not neutron-absorbing elements, the purity specified is easily achieved and generally expected in the reactor art. The alloying metal must be of a correspondingly high neutronic and chemical purity.

To prepare any of the alloys, a magnesium oxide or other suitable crucible is arranged in a conventional vacuum furnace heated by resistance elements or by an induction coil connected to an induction furnace circuit. The alloying metal in chunk or button form is placed in the crucible first, as it is lighter. Then chunks or buttons of plutonium are added. In this way, since the plutonium is the heavier element, the plutonium, when melted, will tend to flow through the alloying element and mix with it. At room temperature, the vacuum within the furnace should be $10^{-4}$ mm. of Hg or better. When the metal is melted, out-gassing from the metal and crucible will degrade the vacuum to about $10^{-3}$ to $5 \times 10^{-4}$ mm. of Hg. It has been found that mixing of the melted elements is faster if an induction type furnace is used. The range of 10 kc. to 5 mc. frequency is suggested and 0.5 mc. is very satisfactory. In order to melt the two elements, it is only necessary to raise the temperature of the mixture to the melting point of plutonium. However, in the interest of speed, the mixture is raised to about 1000° C. to 1200° C. In the preferred embodiment, after the mix has been in a melted state for a few minutes, the furnace is shunt down and the alloy cools in the crucible. The crucible is then broken and the alloy slug recovered. It is recognized that an alloy shape could be cast within the furnace, if so desired. When small samples are prepared, a concentrator ring, well known in the art, is placed inside the induction coil to concentrate the alternating currents in the metal in the necessarily small crucible. Because of the personnel hazard from the high alpha activity of the plutonium, all operations are carried on in protective hoods, or through remotely controlled apparatus, as is well known in the art.

When the low melting point alloy of this invention is used in a complete liquid fuel system, it is necessary to contain the liquid fuel by materials which are resistant to the corrosive characteristics of the fuel. It has been found that the elements niobium, tantalum, tungsten, molybdenum, chromium or vanadium are, in general, very satisfactory from a corrosive point of view. It is recognized, however, that in the present state of the metallurgical art certain of these elements are easier to fabricate into container shapes than others. Tantalum is the best metal for the plutonium-cobalt, plutonium-iron and plutonium-nickel systems, having excellent corrosion resistance even under very high temperature (1300° C.) tests. Tungsten has better corrosion resistance properties than tantalum, but is more difficult to fabricate.

As a container material, combinations of the above-named elements are also possible, and it is realized by this invention that certain combinations will have excellent corrosion resistance, as well as good fabrication qualities.

When the alloy is intended to be used as a liquid, as for example a liquid fuel in a reactor, auxiliary heating apparatus may be provided for premelting the alloy, as in the start up operations in a nuclear reactor. Once in use in a critical reactor region, the alloy will be kept in liquid form by the heat of the nuclear reaction.

What is claimed is:

1. An alloy consisting essentially of plutonium and about 8–15 atomic percent of at least one metal selected from the group consisting of iron, cobalt and nickel.
2. An alloy consisting essentially of plutonium and about 8–15 atomic percent of iron.
3. An alloy consisting essentially of plutonium and about 8–15 atomic percent of cobalt.
4. An alloy consisting essentially of plutonium and about 8–15 atomic percent of nickel.
5. A eutectic alloy of a major proportion of plutonium and a minor proportion of at least one metal selected from the group consisting of iron, cobalt and nickel.
6. A eutectic alloy of about 14.0 atomic percent nickel and the balance plutonium.
7. A eutectic alloy of about 9.5 atomic percent iron and the balance plutonium.
8. A eutectic alloy of about 12.0 atomic percent cobalt and the balance plutonium.

References Cited in the file of this patent

UNITED STATES PATENTS 2,574,627   Daane et al. _____ Nov. 13, 1951